United States Patent
Nakayasu et al.

(10) Patent No.: US 7,591,483 B2
(45) Date of Patent: Sep. 22, 2009

(54) GAS GENERATOR FOR RESTRAINING DEVICE FOR VEHICLE

(75) Inventors: Masayuki Nakayasu, Tatsuno (JP); Noriaki Noma, Tatsuno (JP)

(73) Assignee: Daicel Chemical Industries, Ltd., Osaka-shi (JP)

( * ) Notice: Subject to any disclaimer, the term of this patent is extended or adjusted under 35 U.S.C. 154(b) by 0 days.

(21) Appl. No.: 11/927,503

(22) Filed: Oct. 29, 2007

(65) Prior Publication Data
US 2008/0129027 A1 Jun. 5, 2008

Related U.S. Application Data

(60) Provisional application No. 60/865,754, filed on Nov. 14, 2006.

(30) Foreign Application Priority Data
Nov. 6, 2006 (JP) .............................. 2006-299783

(51) Int. Cl.
*B60R 21/26* (2006.01)
(52) U.S. Cl. ...................... 280/741; 280/736
(58) Field of Classification Search ................. 280/736, 280/740, 741, 742; 102/530, 531, 202.5, 102/202.8, 202.9, 202.11, 202.12, 202.14
See application file for complete search history.

(56) References Cited
U.S. PATENT DOCUMENTS

| 6,032,979 A | 3/2000 | Mossi et al. |
| 6,886,855 B2 * | 5/2005 | Cheal et al. .................. 280/741 |
| 2005/0121894 A1 * | 6/2005 | Brisighella et al. .......... 280/741 |
| 2005/0127649 A1 * | 6/2005 | Smith .......................... 280/741 |
| 2005/0200107 A1 | 9/2005 | Matsuda et al. |
| 2006/0017270 A1 * | 1/2006 | Quioc et al. ................. 280/741 |
| 2007/0057496 A1 * | 3/2007 | Matsuda et al. ............. 280/737 |
| 2007/0085314 A1 * | 4/2007 | Matsuda et al. ............. 280/740 |

FOREIGN PATENT DOCUMENTS

JP        2005-199867 A        7/2005

* cited by examiner

*Primary Examiner*—Paul N. Dickson
*Assistant Examiner*—George D. Spisich
(74) *Attorney, Agent, or Firm*—Birch, Stewart, Kolasch & Birch, LLP

(57) ABSTRACT

The present invention provides a gas generator for a restraining device for a vehicle, including: an igniter attached via an igniter collar to an opening in a housing bottom portion; the igniter collar including a main body portion that supports the igniter and an attachment portion that is fixed to the housing bottom portion; at least part of the attachment portion absorbing strains caused by deformation of the housing, sealing between the housing and the igniter collar, by deforming itself correspondingly to deformation of the housing when the housing deforms during the actuation.

6 Claims, 5 Drawing Sheets

(a)

(a)

(b)

GAS GENERATOR FOR RESTRAINING DEVICE FOR VEHICLE

This nonprovisional application claims priority under 35 U.S.C. § 119(a) on Patent Application No. 2006-299783 filed in Japan on 6 Nov. 2006, and 35 U.S.C. § 119(e) on U.S. Provisional Application No. 60/865,754 filed on 14 Nov. 2006, which are incorporated by reference.

BACKGROUND OF INVENTION

1. Field of Invention

The present invention relates to a gas generator for a restraining device for a vehicle that is suitable for an air bag apparatus or the like.

2. Description of Related Art

Preferable gas generators for a restraining devices for vehicles have a simple internal structure and are easy to assemble. Accordingly, a known structure is such that an outer shell housing is formed from a diffuser and a closure to have only a single welded part in view of minimizing the number of welded parts.

A gas generator of U.S. Pat. No. 6,032,979 has a structure in which a distal end portion of a side wall 22 of a diffuser cap 16 is attached by welding to a base portion 14 where a bracket 32 is formed. An igniter 62 is attached to an adapter 64 and further attached to a mounting opening 26 of the base portion 14. An igniter device 90 is likewise attached to an adapter 92 and further attached by a method such as welding to a mounting opening 30.

SUMMARY OF INVENTION

The present invention provides a gas generator for a restraining device for a vehicle, including:

an igniter attached via an igniter collar to an opening in a housing bottom portion;

the igniter collar including a main body portion that supports the igniter and an attachment portion that is fixed to the housing bottom portion;

at least part of the attachment portion absorbing strains to seal between the housing and the igniter collar, by deforming correspondingly to deformation of the housing when the housing deforms during the actuation.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
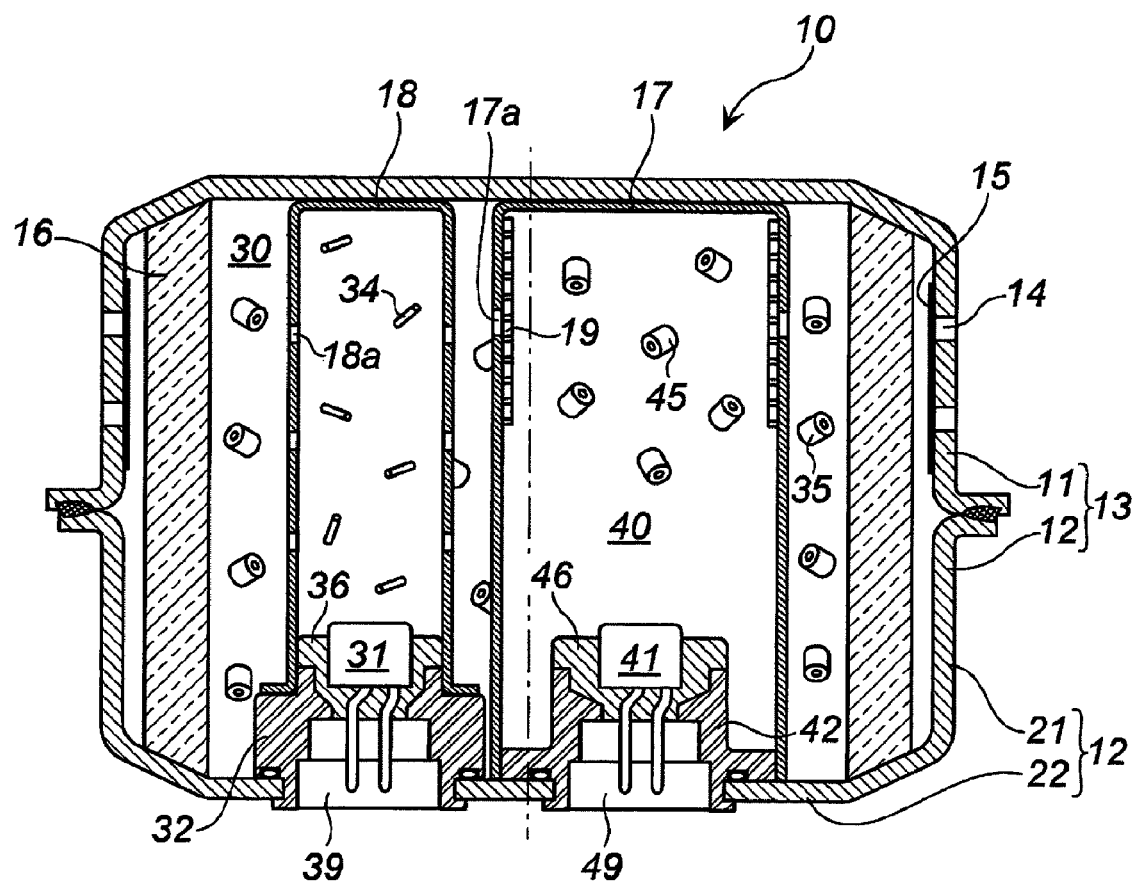
FIG. 1 shows vertical sectional view of a gas generator in accordance with the present invention.
Figure 1:
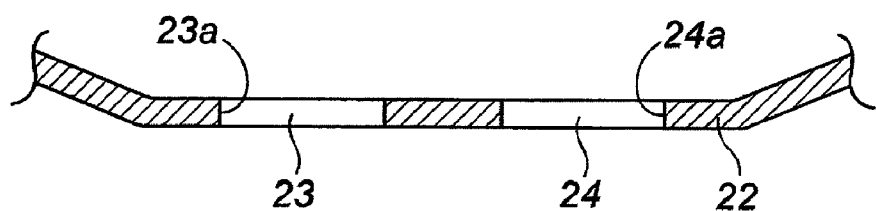

In a gas generator of U.S. Pat. No. 6,032,979, an outer shell container has a structure in which the diffuser cap 16 is welded to the base portion 14 and thereby it may be considered that the housing is deformed by an internal pressure of the container when the gas generator is actuated. In such a case, if the adapters 64, 92 are made hard, a fixing means (weld, etc.) provided between the adapters and the base portion is fractured following the deformation of the housing (in particular, the base portion 14), a gap is easily produced therebetween, and sealing inside the housing cannot be maintained.

The present invention relates to a gas generator for a restraining device for a vehicle in which the structure is simplified and sealing ability of the housing during actuation can be maintained and gas leak can be prevented.

When the gas generator is actuated, the pressure inside the housing rises due to gas generation by combustion of a gas generating agent. When the housing deforms and strains appear therein due to such increase in internal pressure, a gap appears in the connection portion of the opening of the housing bottom portion and the igniter collar attached thereto, cracks appear in the housing, and there is a risk of the combustion gas leaking therefrom.

In order to prevent the deformation of housing caused by increase in internal pressure, it is possible to increase the housing thickness or dispose a support member inside the housing. However, such measures increase the weight and size of gas generator.

In accordance with the present invention, when such increase in internal pressure causes deformation of the housing, the igniter collar deforms correspondingly to the housing deformation and absorbs strains caused by housing deformation, thereby preventing the appearance of gap in the connecting portion of the housing and the igniter collar and preventing formation of cracks and the like in the housing. As a result, sealing ability is maintained and gas leak can be prevented.

The igniter collar is made of a metal such as iron or stainless steel and has a structure in which the igniter main body is to be fixed directly or via another member made of a resin or the like to a concavity (usually, a hole for passing through a conductive pin is provided in the bottom portion) formed inside the igniter collar.

In the present invention, the terms "the radial direction" and "the axial direction" are based on the housing.

The present invention further provides the gas generator for a restraining device for a vehicle, wherein the attachment portion of the igniter collar has a protruding portion that protrudes outwardly in the opening of the housing, and the protruding portion has a fixing annular groove in which a concavity is formed in the radial direction; and the fixing annular groove is fitted to a circumferential edge of the opening of the housing bottom portion, whereby the igniter collar is fixed to the housing.

Because the igniter collar is thus fixed in a state in which the fixing annular groove is tightly fitted to the opening of the housing bottom portion, even when the housing deforms and strains appear therein during actuation, the igniter collar does not fall out from the housing, which is effective for prevention of gas leak.

The present invention further provides the gas generator for a restraining device for a vehicle, wherein part of the attachment portion is in contact with an inner surface of the housing bottom portion in the vicinity of the opening, and a portion that is in contact with the inner surface is deformed upon reception of an external force.

Because part of the attachment portion is thus deformed, strains caused by housing deformation during actuation can be absorbed.

The present invention further provides the gas generator for a restraining device for a vehicle, wherein part of the attachment portion is in contact with an inner surface of the housing bottom portion in the vicinity of the opening, and a portion that is in contact with the inner surface is formed to be thinner than other portions.

Because part of the attachment portion is thus deformed, strains caused by housing deformation during actuation can be absorbed.

The present invention further provides the gas generator for a restraining device for a vehicle, wherein part of the attachment portion has a deformable annular groove in which a concavity is formed in the axial direction in a portion that is in contact with an inner surface of the housing bottom portion;

the deformable annular groove is formed by an annular inner wall, an annular top wall, and an annular outer wall, and an O-ring made of an elastic member is inserted into an annular space formed by the annular inner wall, the annular top wall, the annular outer wall, and the housing bottom portion; and when the housing deforms during actuation, at least one among the annular inner wall, the annular top wall and the annular outer wall deforms correspondingly to the deformation of the housing, strains induced by the deformation of the housing are therefore absorbed and sealing between the housing and the ignited collar is attained.

Because at least one among the annular inner wall, the annular top wall, and the annular outer wall that form the deformable annular groove is thus deformed, strains caused by housing deformation during actuation can be absorbed. The O-ring inserted into the deformable annular groove also deforms correspondingly to the housing deformation, thereby further intensifying the strain absorption action, while maintaining sealing ability.

The gas generator in accordance with the present invention can be applied to a single-type system including a single ignition device and a duel-type system including two ignition device in which ignition can be induced simultaneously or with a delay in time.

The gas generator in accordance with the present invention has a simplified structure and the entire gas generator is reduced in weight. At the same time, even when the housing is deformed by pressure during actuation, sealing ability between the housing and the igniter collar is maintained and gas leak is prevented.

Figure 2:
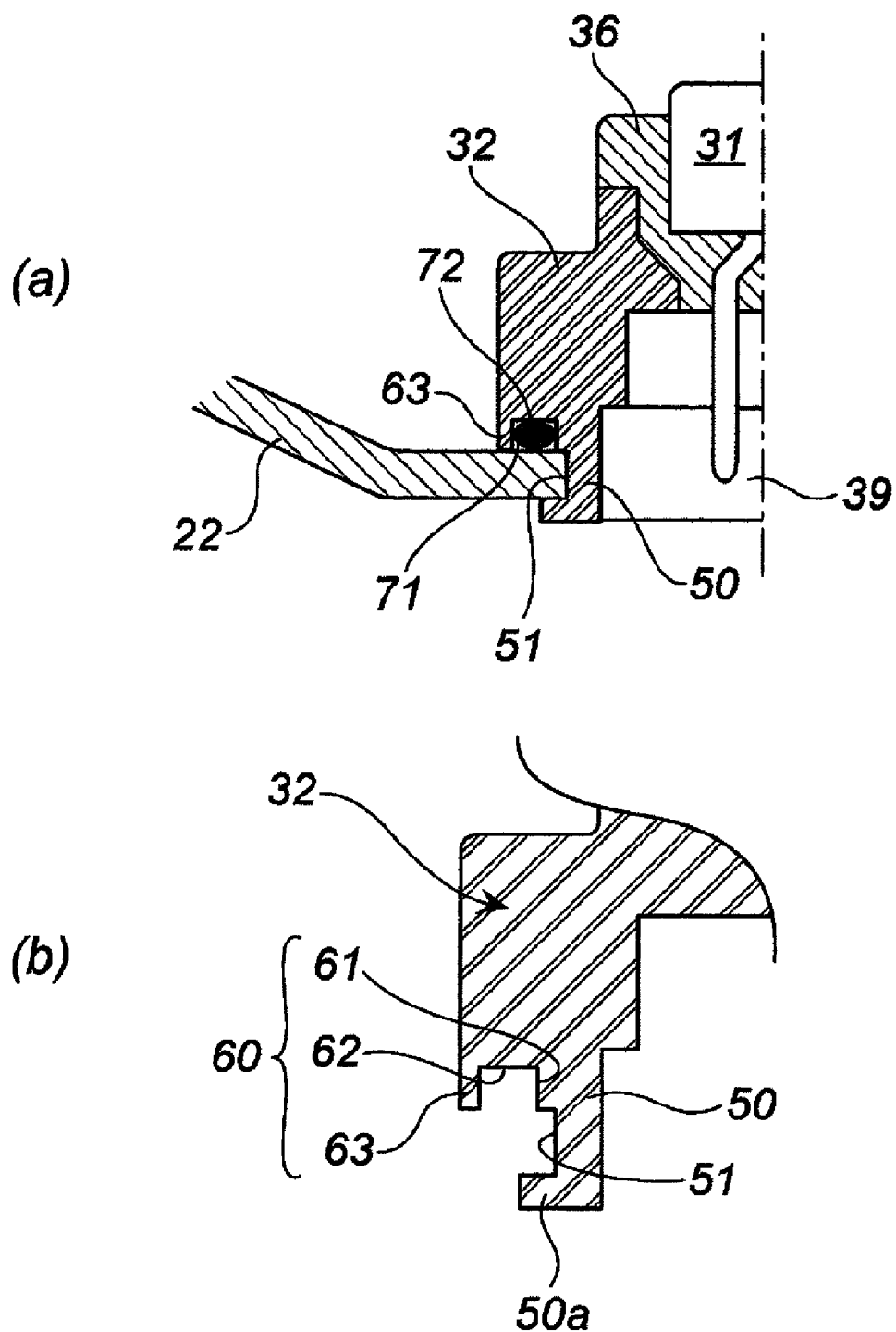
FIG. 2(*a*), (*b*) show partial enlarged sectional views for describing the attachment structure of the ignition collar to the housing in the gas generator shown in FIG. 1.

EMBODIMENTS OF INVENTION (1) Gas Generators of FIGS. 1, 2

Figure 3:
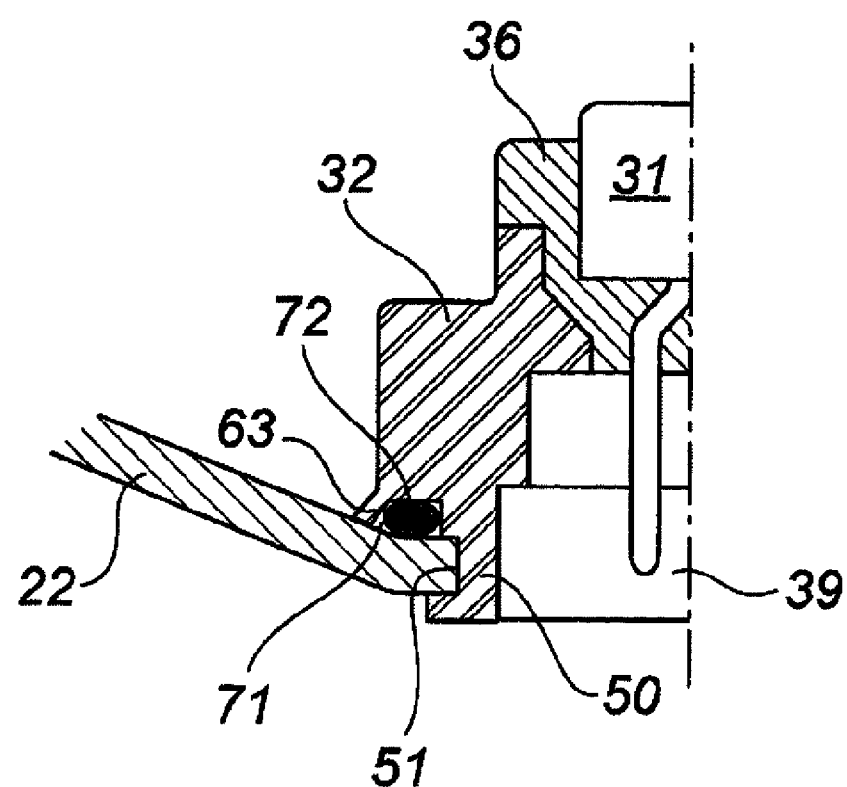
FIG. 3 shows a partial enlarged sectional view for describing the operation of the gas generator shown in FIG. 1(*a*)

FIG. 1(a) is a vertical sectional view of a gas generator 10 in accordance with the present invention. FIG. 1(b) is a partial sectional view of the gas generator shown in FIG. 1(a) (partial sectional view of the housing prior to assembling). FIGS. 2(a), (b) are partial enlarged sectional views that describe the attachment structure of the ignition collar to the housing. FIG. 3 is a partial enlarged sectional view that describes the operation of the gas generator 10 shown in FIG. 1(a).

A housing 13 is formed by welding and fixing a diffuser shell 11 and a closure shell 12 in respective flange portions. The diffuser shell 11 has a plurality of gas discharge ports 14 and is closed with an aluminum tape 15 from the inside for moisture proof. A cylindrical coolant/filter 16 is disposed at a certain distance from the gas discharge ports 14 inside the housing 13.

As shown in FIG. 1(b), the closure shell 12 has a circumferential wall portion 21 and a bottom portion 22. The bottom portion (housing bottom portion) 22 has a first opening 23 and a second opening 24 for attaching two ignition device.

An inner shell 17 is disposed inside the housing 13, and a space bounded by the inner wall surface of the housing 13, an inner circumferential surface of the coolant/filter 16, and the outer surface of the inner shell 17 serves as a first combustion chamber 30.

The first ignition device including a first igniter 31 and a first igniter collar 32 is attached to the first opening 23 facing the inside of the first combustion chamber 30, and the first igniter 31 and the first igniter collar 32 are integrated by a resin 36.

In the first igniter collar 32, a portion that comes into contact with, and supports, the first igniter 31 and the vicinity thereof represent a main body portion, and a portion that is in contact with the housing bottom portion 22 and the vicinity thereof represent an attachment portion; a concavity facing the outside is a connector insertion space 39. The main body portion and the attachment portion are integrated to form the first igniter collar 32, and no boundary is present therebetween.

As shown in FIG. 2, the attachment portion of the first igniter collar 32 has a protruding portion 50 that protrudes to the outside of the first opening 23. The protruding portion 50 has a fixing annular groove 51 where a concavity is formed in the radial direction, and the fixing annular groove 51 is fitted to a circumferential edge portion 23a of the first opening 23.

The fixing annular groove 51 may be obtained by crimping a distal end portion 50a, that extends straight downward, so as to come into contact with an outer surface of the housing bottom portion 22. Or alternatively, the fixing annular groove 51 that has been formed in advance into the shape shown in the drawing may be fitted to the circumferential edge portion 23a of the first opening 23, and the distal end portion 50a then may be crushed and pressed against the outer surface of the housing bottom portion 22.

The attachment portion of the first igniter collar 32 has a deformable annular groove 60. The deformable annular groove 60 is formed by an annular inner wall 61, an annular top wall 62, and an annular outer wall 63. An O-ring 72 formed of an elastic member is inserted into an annular space 71 formed by the deformable annular groove 60 and the inner surface of the housing bottom portion 22.

The annular outer wall 63 forming the deformable annular groove 60 is formed to be thinner than other wall portions forming the annular groove 60 or the wall portions forming the fixing annular groove 51. Therefore, this annular outer wall is easily deformed when a force is applied.

A transfer tube 18 that is closed at the upper end and has a plurality of flame propagation nozzles 18a in the circumferential wall is disposed at a certain distance from the inner shell 17 inside the first combustion chamber 30. A plurality of flame propagation nozzles 18a are closed from the outside with a seal tape (not shown in the drawing).

The inside of the flame propagation tube 18 serves as an ignition device chamber 33 and is filled with a predetermined amount of a transfer charge 34. An closed surface at the upper end of the transfer tube 18 is abutted against the top surface of the housing 13. And while the transfer tube encloses the ignition portion of the first igniter 31, the flange portion of the opening at the lower end thereof abuts against the first igniter collar 32. As a result, the transfer tube is fixed by being sandwiched from above and below.

In addition to a known transfer charge such as boron nitrate, a gas generating agent (nitroguanidine-based gas generating agents) that has a high combustion temperature and is disclosed in JP-A No. 2005-199867 can be used as the transfer charge 34.

An outside of the transfer tube 18 that is disposed in the first combustion chamber 30 is filled with a predetermined amount of a first gas generating agent 35. A gas generating agent having a low combustion temperature that is disclosed in JP-A No. 2005-199867 can be used as the first gas generating agent 35.

The second combustion chamber 40 is a space surrounded by the inner shell 17 and the inside thereof is filled with a predetermined amount of the second gas generating agent 45. The volume of the first combustion chamber 30 may be the same as or different from that of the second combustion chamber 40. The inner shell 17 has a through hole 17a in the circumferential wall surface, this through hole being covered from the inside with a filter 19 made in the form of wire mesh.

The inner shell 17 is disposed and fixed eccentrically with respect to the central axis of the housing 13. The degree of eccentricity of the inner shell 17 can be appropriately selected within a range of 10 to 75%. The inner shell 17 is so disposed that a gap is formed between the inner shell and the coolant/filter 16. This gap is provided in order to produce a flow of gas between the coolant/filter 16 and inner shell 17 and effectively use the whole area of the coolant/filter 16. Furthermore, the gap also serves so that the coolant/filter 16 may not be any obstacle for an opening of the inner shell 17 to open.

The second gas generating agent 45 may be identical to the first gas generating agent 35 or may differ therefrom by at least one parameter selected from burning rate, composition, composition ratio, and filling amount. If necessary, a transfer charge identical to that of the first combustion chamber 30 may be disposed inside the second combustion chamber 40. A transfer charge, like 34, may be disposed in the second combustion chamber.

A second ignition device including a second igniter 41 and a second igniter collar 42 is attached to a second opening 24 facing the second combustion chamber 40, and the second igniter 41 and second igniter collar 42 are integrated by a resin 46.

The attachment structure of the second igniter collar 42 to the circumferential edge portion 24a of the second opening 24 formed in the housing bottom portion 22 are identical to that of the first igniter collar 32.

Next, the operation of the gas generator 10 assembled with an airbag system of an automobile will be described below with reference to FIGS. 1 to 3.

When the automobile collides and receives the impact, an actuation signal is received from a control unit, the first igniter 31 is actuated and ignited, the transfer charge 34 located inside the transfer tube 18 is ignited and combusted by the flame generated by the ignition of the first igniter 31, and flame and high-temperature gas are discharged from the flame propagation nozzle 18a.

The first gas-generating agent 35 is ignited and combusted and high-temperature gas is generated under the effect of flame and high-temperature gas discharged from the flame propagation nozzle 18a. The generated high-temperature gas is cooled and filtered while passing through the coolant/filter 16, then ruptures the aluminum tape 15, is discharged from the gas discharge port 14, and inflates the airbag.

With a slight delay after the actuation of the first igniter 31, the second igniter 41 is actuated and ignited, generating flame, the second gas generating agent 45 is ignited and combusted thereby, and high-temperature gas is generated. This high-temperature gas is discharged from the through hole 17a into the first combustion chamber 30, then cooled and filtered while passing through the coolant/filter 16, and discharged from the open gas discharge port 14, thereby further inflating the air bag.

When the housing 13 (housing bottom portion 22) deforms, as shown in FIGS. 2(*a*) to 3, due to the increase of the internal pressure in the course of such operation process, the annular outer wall 63, which is thinner than all other portions, deforms correspondingly to the deformation of the housing 13, and then the O-ring 72 inserted into the annular groove 71 is pressed and deformed.

Such deformation of the annular outer wall 63 and the O-ring 72 results in the absorption of strains caused by the deformation of the housing 13. Further, because the igniter collar 32 and the first opening 23 are tightly joined by the fixing annular groove 51, the joint state thereof is maintained even when the housing 13 is deformed. Therefore, even when the housing 13 is deformed, no gap appears in the joint section of the igniter collars 32, 42 and housing 13, no cracks appear in the housing bottom portion 22 and the like, and the sealed state created by the O-ring 72 is maintained, thereby preventing gas leak during actuation.

Figure 4:
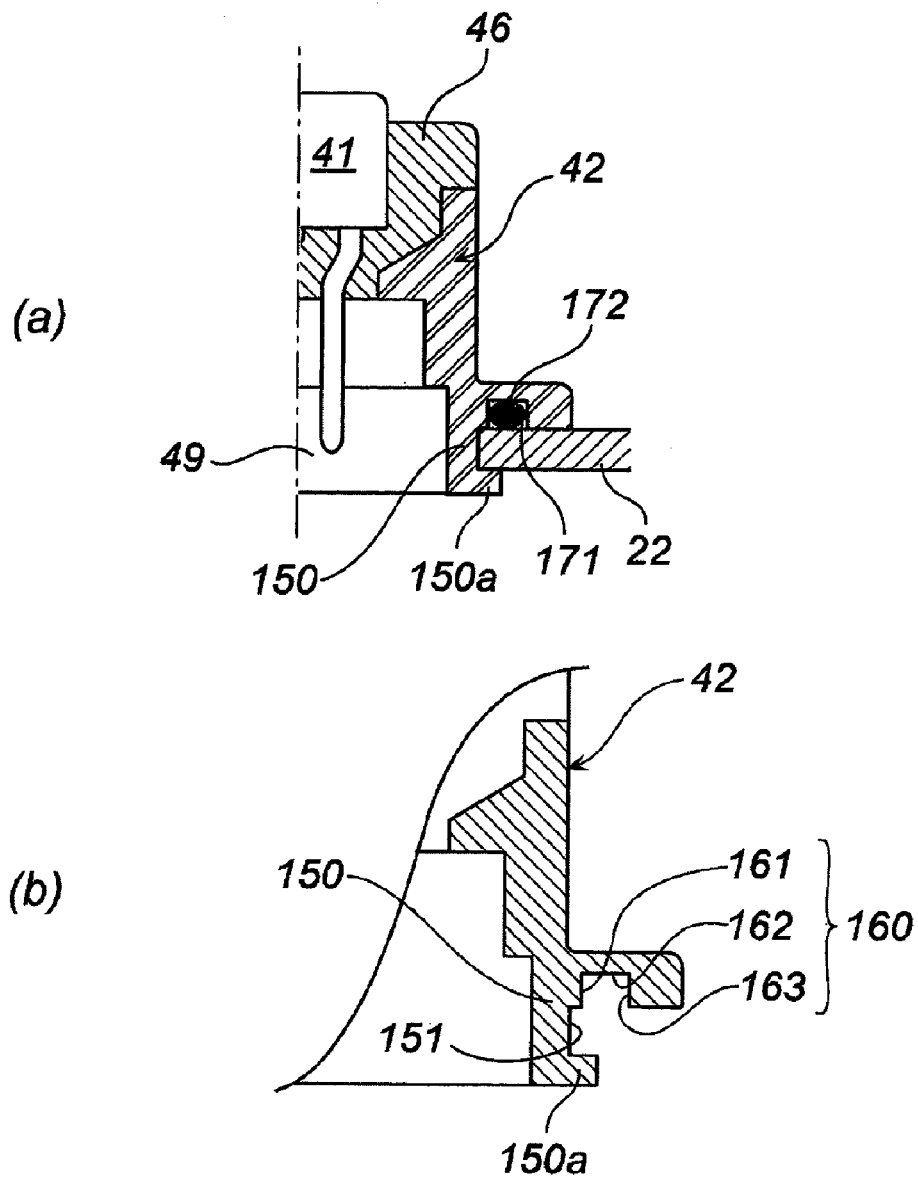
FIG. 4(*a*), (*b*) show partial enlarged sectional views illustrating the attachment structure of the igniter collar to the housing in the gas generator of another embodiment.
Figure 5:
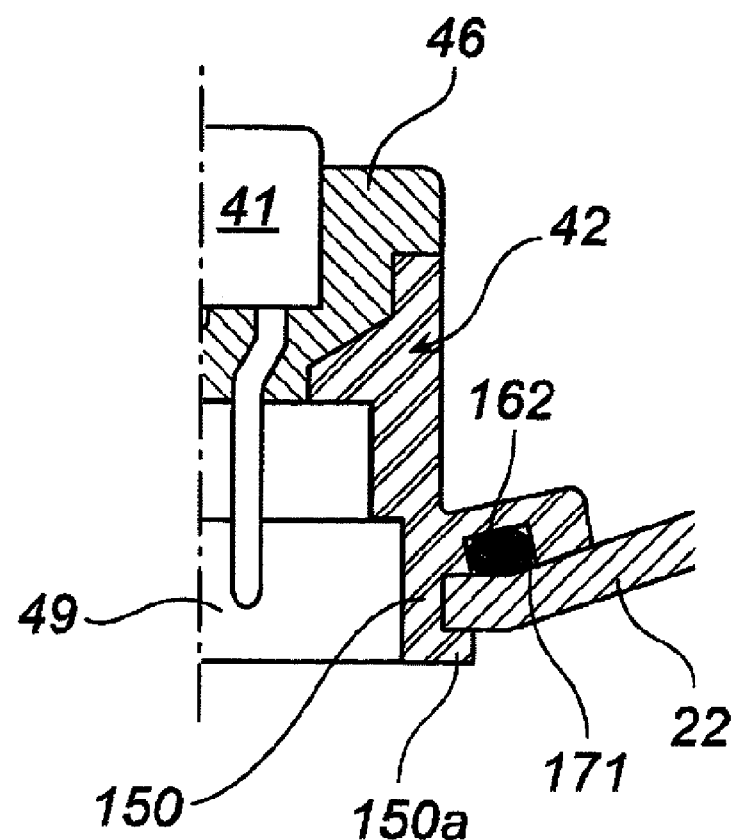
FIG. 5 shows a partial enlarged sectional view for describing the operation of the gas generator shown in FIG. 4.

(2) Gas Generator of FIGS. 4, 5

FIGS. 4(*a*), (*b*) are partial enlarged sectional views illustrating the attachment structure of the igniter collar to the housing of the gas generator that is another embodiment. FIG. 5 is a partial enlarged sectional view for describing the operation of the gas generator shown in FIG. 4(*a*). In the gas generator shown in FIGS. 4, 5, the attachment structure of the igniter collar to the housing differs from that of the gas generator 10 shown in FIG. 1, and the reference symbols identical to those in FIG. 1 refer to identical components.

A second igniter device including a second igniter 41 and a second igniter collar 42 is attached to a second opening 24 facing the inside of a second combustion chamber 40, and the second igniter 41 and the second igniter collar 42 are integrated by a resin 46.

In the second igniter collar 42, a portion that comes into contact with, and supports, the second igniter 41 and the vicinity thereof represent a main body portion, and a portion that is in contact with the housing bottom portion 22 and the vicinity thereof represent an attachment portion; a concavity facing the outside is a connector insertion space 49. The main body portion and the attachment portion are integrated and form the second igniter collar 42, and no boundary is present therebetween.

The attachment portion of the second igniter collar 42 has a protruding portion 150 that protrudes out of the second opening 24. The protruding portion 150 has a fixing annular groove 151 where a concavity is formed in the radial direction, and the fixing annular groove 151 is fitted to a circumferential edge portion 24a of the second opening 24.

The fixing annular groove 151 may be obtained by crimping a distal end portion 150a that extends straight downward so as to come into contact with an outer surface of the housing bottom portion 22. Or alternatively, the fixing annular groove 151 that has been formed in advance into the shape shown in the drawing may be fitted to the circumferential edge portion 24a of the second opening 24, and the distal end portion 150a then may be crushed and pressed against the outer surface of the housing bottom portion 22.

The attachment portion of the second igniter collar 42 has a deformable annular groove 160. The deformable annular groove 160 is formed by an annular inner wall 161, an annular top wall 162, and an annular outer wall 163. An O-ring 172 formed of an elastic member is inserted into an annular space 171 formed by the deformable annular groove 160 and the inner surface of the housing bottom portion 22.

The annular top wall 162 forming the deformable annular groove 160 is formed to be thinner than other wall portions forming the annular groove 160 or the wall portions forming the fixing annular groove 151. Therefore, this wall is easily deformed when a force is applied.

The attachment structure of the first igniter collar 32 to the circumferential edge portion 23a of the first opening 23 formed in the housing bottom portion 22 is identical to that of the second igniter collar 42.

In the case where the gas generator 10 shown in FIG. 1 has the attachment structure shown in FIGS. 4, 5, when the housing 13 deforms, as shown in FIGS. 4(a) to 5, due to increase of the internal pressure, the annular top wall 162, which is formed to be thinner than all other portions, deforms correspondingly to the deformation of the housing 13, and then the O-ring 172 inserted into the annular groove 171 is pressed and deformed.

Such deformation of the annular top wall 162 and O-ring 172 results in the absorption of strains caused by the deformation of the housing 13. Further, because the igniter collar 42 and the second opening 24 are tightly joined by the fixing annular groove 151, the joint state thereof is maintained even when the housing 13 is deformed. Therefore, even when the housing 13 is deformed, no gap appears in the joint section of the igniter collars 32, 42 and housing 13, no cracks appear in the housing bottom portion 22 and the like, and the sealed state created by the O-ring 172 is maintained, thereby preventing gas leak during actuation. FIGS. 2 to 5 show an example of deformation of the annular groove caused by the deformation of housing, but the deformation mode is not limited to these embodiments.

FIGS. 1 to 5 illustrate embodiments of a dual-type gas generator, but the attachment structure shown in FIG. 2 or the attachment structure shown in FIG. 4 can be also applied as an attachment structure to the housing of a single-type gas generator, such gas generator having one ignition device including an igniter collar fixing the igniter.

The invention thus described, it will be obvious that the same may be varied in many ways. Such variations are not to be regarded as a departure from the spirit and scope of the invention, and all such modification s as would be obvious to one skilled in the art are intended to be included within the scope of the following claims.

The invention claimed is:

1. A gas generator for a restraining device for a vehicle, comprising:
    an igniter attached via an igniter collar to an opening in a housing bottom portion;
    the igniter collar including a main body portion that supports the igniter and an attachment portion that is fixed to the housing bottom portion, the attachment portion further including, an annular inner wall, an annular top wall, and an annular outer wall, at least one of the annular outer wall and the annular top wall being formed to be thinner than the remaining two of the annular inner wall, the annular top wall, and the annular outer wall;
    at least part of the attachment portion absorbing strains to seal between the housing and the igniter collar, by deforming correspondingly to deformation of the housing when the housing deforms during the actuation.

2. The gas generator for a restraining device for a vehicle according to claim 1, wherein
    the attachment portion of the igniter collar has a protruding portion that protrudes outwardly in the opening of the housing, and the protruding portion has a fixing annular groove in which a concavity is formed in a radial direction; and
    the fixing annular groove is fitted to a circumferential edge of the opening of the housing bottom portion, whereby the igniter collar is fixed to the housing,
    wherein the annular groove is formed by the annular inner wall, the annular top wall, and the annular outer wall.

3. The gas generator for a restraining device for a vehicle according to claim 2, wherein the annular groove is deformable and formed in the axial direction in a portion that is in contact with an inner surface of the housing bottom portion;
    an O-ring made of an elastic member is inserted into the annular groove; and
    when the housing deforms during actuation, at least one of the annular top wall and the annular outer wall deforms correspondingly to the deformation of the housing, strains induced by the deformation of the housing are therefore absorbed and sealing between the housing and the igniter collar is attained.

4. The gas generator for a restraining device for a vehicle according to claim 1, wherein part of the attachment portion is in contact with an inner surface of the housing bottom portion in the vicinity of the opening, and a portion that is in contact with the inner surface is deformed upon reception of an external force.

5. The gas generator for a restraining device for a vehicle according to claim 1,
    wherein the main body portion and the attachment portion are formed integrally.

6. The gas generator for a restraining device for a vehicle according to claim 1,
    wherein the housing bottom portion to which the igniter collar is attaches is formed flat.

* * * * *